United States Patent [19]
Fischer et al.

[11] 4,124,751
[45] Nov. 7, 1978

[54] PROCESS FOR PREPARING ACRYLIC ACID OR METHACRYLIC ACID ESTER POLYMER HAVING A HIGH ISOTACTICITY AND A NARROW MOLECULAR WEIGHT DISTRIBUTION

[75] Inventors: Johann P. Fischer, Konigstein, Taunus; Friedrich Cavagna; Eduard Duch, both of Hofheim am Taunus; Karl-Friedrich Muck, Wiesbaden, all of Fed. Rep. of Germany

[73] Assignee: Hoechst Aktiengesellschaft, Frankfurt am Main, Fed. Rep. of Germany

[21] Appl. No.: 829,874

[22] Filed: Sep. 1, 1977

[30] Foreign Application Priority Data

Sep. 3, 1976 [DE] Fed. Rep. of Germany ....... 2639669

[51] Int. Cl.$^2$ ...................... C08F 4/72; C08F 220/10; C08F 220/14
[52] U.S. Cl. ........................................ 526/82; 526/83; 526/84; 526/85; 526/183; 526/328; 526/329.7
[58] Field of Search ............... 526/82, 183, 328, 329.7

[56] References Cited
U.S. PATENT DOCUMENTS

| | | | |
|---|---|---|---|
| 3,100,761 | 8/1963 | Fellman et al. | 526/183 |
| 3,222,339 | 12/1965 | Fellman et al. | 526/183 |

Primary Examiner—Harry Wong, Jr.
Attorney, Agent, or Firm—Curtis, Morris & Safford

[57] ABSTRACT

Esters of acrylic acid and methacrylic acid may be polymerized with the aid of either free radical forming or ionically effective initiators. The stereospecificy of the polymers may be influenced by the selection of specific initiators; magnesium-organic compounds are suitable for the synthesis of isotactic polymers. Acrylic acid and methacrylic acid esters having a high degree of isotacticity and a narrow molecular weight distribution are obtained with the aid of substituted phenylmagnesium halides. They are suitable as gauge and as test substances.

10 Claims, No Drawings

PROCESS FOR PREPARING ACRYLIC ACID OR METHACRYLIC ACID ESTER POLYMER HAVING A HIGH ISOTACTICITY AND A NARROW MOLECULAR WEIGHT DISTRIBUTION

It is known that free radical forming initiators are suitable for preparing crystalline polymethacrylic acid esters (cf. J. Polymer Sci. 31(1958), pages 173 et seq.). It is further known that the stereospecific anionic polymerization of methacrylic acid methyl esters may be initiated by metal-organic compounds, especially lithium-organic compounds leading to polymers having a high degree of isotacticity (cf. J. Polymer Sci. 46 (1960), pages 317 et seq.). The acrylic and methacrylic acid ester polymers prepared using lithium-organic or magnesium-organic compounds, however, have a broad molecular weight distribution $\overline{M}_v/\overline{M}_n$ (quotient of average viscosity and average number of the molecular weight), of 3.24 or more (cf. J. Polymer Sci. 47 (1960), pages 75 et seq.). Furthermore, the synthesis of isotactic polyisopropylacrylic acid ester with phenylmagnesium bromide as anionic initiator at a temperature of −78° C. in toluene has already been described (cf. J. Polymer Sci. Part A-1, volume 10(1972), pages 1179 et seq.). Finally it is known to polymerize esters of acrylic acid with monovalent alcohols branched in α-position with the aid of Grignard compounds, at a temperature of from 0° to −80° C. in an inert organic solvent, with the exclusion of oxygen and water, the atactic portion of the polymers obtained being at most 25% by weight (cf. German Offenlegungsschrift 23 59 621); for attaining a molecular weight distribution range of 2 or less, the polymers must frequently be submitted to precipitation fractionation processes.

The present invention seeks to provide a process for the preparation of a polyacrylic acid ester and of a polymethacrylic acid ester having mainly an isotactic structure and a molecular weight as narrow as possible. The ester should have an isotacticity of at least 90%, preferably of at least 95%, and a molecular weight distribution range of less than 1.5, preferably of 1.1 to 1.3 (defined as the quotient of average weight and average number of the molecular weight $\overline{M}_w/\overline{M}_n$). The molecular weight of the ester should be from 2,000 to 100,000, preferably of from 5,000 to 40,000 (weight average).

The subject of the present invention, consequently, is a process for the preparation of a methacrylic acid or acid ester polymer having an average molecular weight (weight average) of from 2,000 to 100,000, a molecular weight distribution range of less than 1.5 and an isotacticity of at least 90%, by polymerization of an acrylic acid alkyl ester in an inert, non-polar organic solvent, at a temperature of from −94° to +30° C., in the presence of a magnesium-organic compound, which comprises using as the acrylic acid alkyl ester an ester with an alkanol having from 1 to 4 carbon atoms and as magnesium-organic compound a phenylmagnesium halide having at least one substituent in ortho position with regard to magnesium.

Suitable monomers are preferably acrylic acid methyl ester, acrylic acid ethyl ester, acrylic acid isopropyl ester as well as methacrylic acid methyl ester, methacrylic acid ethyl ester and methacrylic acid isopropyl ester. Monomers having a degree of purity of at least 99.90, preferably of at least 99.99%, are used advantageously.

The process according to the invention is carried out as polymerization in solution using an inert non-polar organic solvent, which preferably has a melting point below −94° C.

Especially suitable are aromatic hydrocarbons, preferably monoalkylbenzenes, for example toluene, ethylbenzene and propylbenzene. The quantity by weight of the solvent is five to hundred times, preferably 10 to 25 times, the quantity of the monomers used in each case.

The process is generally performed at a temperature of from −94° to +30° C., preferably of from −80° to +20° C. Especially advantageous is a polymerization temperature in the range of from −80° to −60° C., for the polymerization of acrylic acid esters and of from −60° to +20° C. for the polymerization of methacrylic acid esters.

The polymerization usually takes place with exclusion of elementary oxygen and water, preferably in an inert gas atmosphere. Suitable inert gases are noble gases, for example argon, and especially nitrogen. It is advisable to free the substances, which are present during the polymerization, from oxygen and water previously.

As initiator, there is used a phenylmagnesium halide carrying a substituent at least in the ortho position with regard to magnesium, a phenylmagnesium halide having two substituents in the ortho-position being especially suitable. The use of a substituted phenylmagnesium bromide is especially advantageous.

A suitable substituted phenylmagnesium halide is in particular a compound of the formula (I)

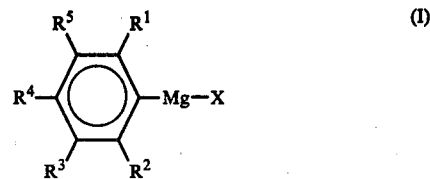

in which X is a halogen atom, preferably a bromine atom, and $R^1$ to $R^5$ each is a hydrogen atom or a hydrocarbon radical having from 1 to 8, preferably 1, 2, 3 or 4, carbon atoms, which radical may be linked to the benzene nucleus via an oxygen atom, no more than one of the substituents $R^1$ and $R^2$ standing for a hydrogen atom. A suitable hydrocarbon radical in this case is especially an alkyl radical as well as a cycloalkyl radical, an arylalkyl radical and an aryl radical. An especially suitable substituted phenyl-mangesium halide as initiator is a compound of the formula (II)

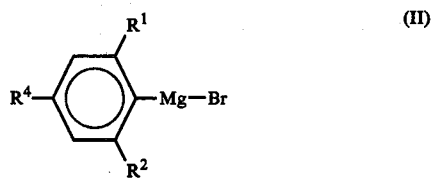

in which $R^1$ and $R^2$ each means an alkyl or alkoxy radical having 1, 2, 3 or 4 carbon atoms and $R^4$ is a hydrogen atom or an alkyl or alkoxy radical having 1, 2, 3 or 4 carbon atoms.

Suitable initiators are, for example, 2-methylphenylmagnesium chloride, -bromide or -iodide, 2,6-dimethylphenylmagnesium chloride, -bromide and -iodide, 2,4,6-trimethylphenylmagnesium chloride, -bromide and -iodide(mesitylmagnesium chloride, -bromide and -iodide) as well as 2,6-dimethyl-4-ethyl-phenylmagnesium chloride, -bromide and -iodide and finally 2,6-dimethyl-4-isopropyl-phenylmagnesium chloride, -bromide and -iodide.

The initiator is used in an amount of from 0.1 to 50, preferably from 1 to 30 mol percent, calculated on the monomer (=100%). The initiator should be added and be dispersed homogeneously in the reaction mixture as quickly as possible, i.e. within 1/30, preferably within 1/100, of the polymerization period.

The initiator is used in dissolved state; suitable solvents for this purpose are any linear aliphatic ethers and cyclic ethers, which are in a liquid state at the polymerization temperature applied, especially linear aliphatic ethers having from 2 to 8 carbon atoms, for example dimethyl ether, diethyl ether and diisopropyl ether, and cyclic mono- or diethers having 4 ring carbon atoms, for example tetrahydrofuran, 1,3-dioxan and 1,4-dioxan.

The use of substituted phenylmagnesium halides as initiators according to the invention enables the direct synthesis of acrylic acid and methacrylic acid ester polymers having the desired properties, to be carried out in simple manner, a further fractionation step after polymerization and precipitation of the polymer not being required. Using these initiators, higher polymerization rates than in the case of the hitherto known unsubstituted phenylmagnesium bromide are rendered possible and generally higher polymer yields are obtained.

The formation of polymers having a range of the molecular weight outside of the range which is aimed at by the invention can be avoided by adding to the polymerization mixture after the end of the main reaction period a rapidly acting chain stopper, within a period of 10 seconds. Thus, the antionic growth of the macromolecules is terminated. The main reaction time depends on the nature and the quantity of the monomers and/or the initiator and/or the temperature, and ranges from 5 minutes to 6 hours, preferably from 10 to 200 minutes. The chain stopper is added when a monomer conversion of at least 90% has been attained and is used in at least the same molar quantity as the initiator. It should act instantaneously, i.e. within a period of at most 10 seconds. to discontinue the reaction immediately after having been added. For this purpose there may be used water and lower alkanols, for example methanol, ethanol and isopropanol; aldehydes, ketones and thioketones, which may be halogenated, for example p-bromo-benzaldehyde, chloroacetophenone and 4,4'-bis(dimethylamino)-thio-benzophenone. Polymers having functional terminal groups may be prepared by using aldehydes, ketones and thioketones as chain stoppers.

The esters prepared according to the invention are suitable as gauge and test substances owing to their narrow molecular weight distribution. Furthermore they may be used as intermediates for the synthesis of pharmacologically effective polymers, for example for the prophylaxis of virus infections.

The following examples illustrate the invention:

EXAMPLES 1 TO 20

(a) The monomer used in these examples is acrylic acid ester, which after drying over calcium hydride has been degassed and distilled under reduced pressure. It has a degree of purity of 99.99%. The solvent used is absolute toluene which has likewise been degassed and distilled under reduced pressure. A 2N mesitylmagnesium bromide solution which has been prepared by reacting 12.3 g (0.5 mol) of magnesium chips and 99.5 g (0.5 mol) of mesityl bromide in 175 ml of diethyl ether, is used as initiator solution.

(b) The polymerizations are carried out in the following manner: In each of the examples 67 g (75 ml; 0.587 mol) of acrylic acid isopropyl ester are mixed with 937 ml of toluene and the mixture is cooled to a temperature of $-78°$ C. In a nitrogen atmosphere, different quantities of the initiator solution are added to the mixture while stirring within a period of 10 seconds and are homogeneously distributed therein. Polymerization is performed at a temperature of $-78°$ C. It is discontinued after different periods of time by adding to the reaction mixture within 10 seconds 32 g (1 mol) of methanol. (In the examples 15 and 16 the polymerization is discontinued by adding 10 g (0.054 mol) of p-bromobenzaldehyde in a solution of toluene.) The mixture is then acidified at room temperature with 500 ml of 1N hydrochloric acid. Thereby a phase separation takes place. The organic phase obtained is washed neutral with water and dried with magnesium sulfate. The polyacrylic acid isopropyl ester dissolved in toluene is precipitated in petrol ether, separated, dried at a pressure of 0.3 bar for 15 hours, under nitrogen, at a temperature of 60° C. and weighed (yield).

(c) The average weight $\overline{M}_w$ and the average number $\overline{M}_n$ of the molecular weight of the dried polymer are determined by gel permeation chromatography. The GPC-fractionations are carried out in four series-connected separation columns of 1.2 m length fed with polystyrene gel, at a temperature of 45° C. using as solvent tetrahydrofuran. The range of the molecular weight distribution results from the quotient $\overline{M}_w/\overline{M}_n$. The isotactic portion is determined with the aid of $^{13}$C-NMR spectra, by means of a 50% by weight solution of the polymer in Deuterochloroform at a temperature of 60° C. or by means of $^1$H-NMR spectra, in a 5% by weight solution of the polymer in chlorobenzene, at a temperature of 140° C.

Further details for the examples 1 to 20 can be seen from the following Table I.

TABLE I

| example | initiator quantity (mol %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---|---|---|---|---|---|---|---|
| 1 | 1.7 | 10 | 4.5 | 11.4 | 9.8 | 1.16 | |
| 2 | 1.7 | 20 | 13.3 | 16.0 | 13.1 | 1.22 | |
| 3 | 1.7 | 40 | 31.7 | 22.5 | 18.9 | 1.99 | |
| 4 | 1.7 | 80 | 46.7 | 34.8 | 27.4 | 1.27 | |
| 5 | 1.7 | 160 | 60.9 | 37.4 | 28.8 | 1.30 | |
| 6 | 3.4 | 10 | 11.8 | 12.6 | 10.3 | 1.22 | |
| 7 | 3.4 | 20 | 19.4 | 16.6 | 13.1 | 1.26 | |
| 8 | 3.4 | 40 | 43.8 | 20.6 | 16.6 | 1.24 | |
| 9 | 3.4 | 320 | 46 | 20.6 | 17.1 | 1.20 | |

TABLE I-continued

| example | initiator quantity (mol %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---|---|---|---|---|---|---|---|
| 10 | 5.1 | 10 | 57 | 17.6 | 15.3 | 1.15 | |
| 11 | 6.8 | 10 | 54.4 | 15.4 | 13.5 | 1.14 | > 95 |
| 12 | 8.5 | 5 | 22.2 | 10.2 | 8.7 | 1.17 | |
| 13 | 8.5 | 10 | 54 | 11.5 | 9.9 | 1.16 | |
| 14 | 8.5 | 22 | 55.1 | 12.8 | 11.1 | 1.15 | |
| 15 | 8.5 | 33 | 53.8 | 12.0 | 10.5 | 1.14 | |
| 16 | 8.5 | 60 | 50.3 | 12.0 | 10.5 | 1.14 | |
| 17 | 8.5 | 360 | 54.6 | 11.4 | 9.9 | 1.15 | |
| 18 | 11.9 | 10 | 55.1 | 8.56 | 7.2 | 1.19 | |
| 19 | 15.2 | 10 | 56 | 6.3 | 5.14 | 1.22 | |
| 20 | 22.0 | 10 | 55.5 | 5.14 | 4.45 | 1.15 | |

EXAMPLES 21 TO 30

(a) The examples are carried out in analogous manner to the Examples 1 to 20 using acrylic acid isopropyl ester as monomer and toluene as the solvent. The initiator solution used however is a 2.71 molar 2-methyl-phenylmagnesium bromide solution which has been prepared by reacting 9.7 g (0.4 mol) of magnesium chips and 68.4 g (0.4 mol) of 2-bromotoluene in 120 ml of diethyl ether.

(b) Polymerization, working up and analysis are performed as indicated in the Examples 1 to 20.

Further details for the Examples 21 to 30 can be seen from the following Table II.

TABLE II

| example | initiator quantity (mol %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---|---|---|---|---|---|---|---|
| 21 | 1.7 | 30 | 15.3 | 14.5 | 12.2 | 1.18 | |
| 22 | 1.7 | 60 | 51.0 | 23.2 | 19.3 | 1.20 | |
| 23 | 1.7 | 120 | 78.1 | 29.2 | 23.5 | 1.24 | |
| 24 | 1.7 | 270 | 82.4 | 28.4 | 22.7 | 1.25 | |
| 25 | 3.4 | 270 | 78.5 | 20.4 | 16.3 | 1.25 | > 95 |
| 26 | 8.5 | 270 | 50.0 | 11.1 | 9.6 | 1.15 | |
| 27 | 17 | 10 | 24.3 | 8.56 | 7.65 | 1.11 | |
| 28 | 17 | 30 | 25.6 | 9.13 | 8.1 | 1.12 | |
| 29 | 17 | 90 | 26.2 | 9.25 | 7.9 | 1.17 | |
| 30 | 17 | 270 | 27.3 | 0.25 | 8.1 | 1.14 | |

EXAMPLES 31 TO 37

(a) The Examples are carried out in analogous manner to the Examples 1 to 20 using acrylic acid isopropyl ester as monomer and toluene as solvent. The initiator solution used, however, is a 2.31 molar 2,6-dimethyl-phenylmagnesium bromide solution which has been prepared by reacting 8.5 g (0.35 mol) of magnesium chips and 64.5 g (0.35 mol) of 2,6-dimethyl-1-bromobenzene in 125 ml of diethyl ether.

(b) Polymerization, working up and analysis are performed as in the Examples 1 to 20.

Further details concerning the Examples 31 to 37 can be seen from the following Table III.

TABLE III

| example | initiator quantity (mol %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---|---|---|---|---|---|---|---|
| 31 | 8.5 | 10 | 12.2 | 8.56 | 7.42 | 1.15 | |
| 32 | 8.5 | 30 | 51.3 | 11.4 | 9.7 | 1.18 | |
| 33 | 8.5 | 90 | 46.4 | 12.0 | 10.28 | 1.17 | |
| 34 | 8.5 | 270 | 52.5 | 12.0 | 10.28 | 1.17 | > 95 |
| 35 | 2.5 | 300 | 72.9 | 24.4 | 19.2 | 1.27 | |
| 36 | 2.1 | 300 | 73.3 | 25.6 | 20.3 | 1.25 | |
| 37 | 1.1 | 300 | 77.8 | 43.0 | 23.3 | 1.29 | |

COMPARATIVE EXAMPLES A TO H (a) As in the Examples 1 to 20, acrylic acid isopropyl ester is used as monomer and toluene as solvent. The initiator solution, however, is a 2,3-molar phenylmagnesium bromide solution which has been obtained by reacting 24.3 g (1 mol) of magnesium chips and 154 g (1 mol) of bromobenzene in 350 ml of diethyl ether.

(b) Polymerization, working up and analysis are performed as in the Examples 1 to 20. (In the comparative examples B, C, D and E, the polymerization is discontinued by adding 10 g (0.065 mol) of chloroacetophenone, 11 g (0.059 mol) of p-bromo-benzaldehyde or 17 g (0.06 mol) of 4,4'-bis-(dimethylamino)-thiobenzophenone.

Further details concerning the comparative examples A to H can be seen from the following Table IV.

TALE IV

| example | initiator quantity (mol %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---|---|---|---|---|---|---|---|
| A | 9.7 | 35 | 22 | 11.5 | 9.8 | 1.17 | |
| B | 9.7 | 40 | 21.7 | 14.0 | 10.3 | 1.27 | |
| C | 9.7 | 43 | 12.2 | 15.9 | 13.0 | 1.22 | |
| D | 9.7 | 50 | 31 | 14.3 | 11.5 | 1.24 | |
| E | 9.7 | 65 | 44.8 | 26.8 | 17.7 | 1.51 | > 90 |

TALE IV-continued

| example | initiator quantity (mol %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---------|---------|-------|----|------|------|------|---|
| F | 9.7 | 80 | 31 | 21.5 | 15.3 | 1.40 | |
| G | 9.7 | 360 | 54 | 24.9 | 15.2 | 1.64 | |
| H | 9.7 | 1260 | 51 | 27.9 | 18.0 | 1.54 | |

EXAMPLES 38, 39 AND 40

(a) The polymerizations are performed using as monomer methacrylic acid methyl ester, which has been purified in analogous manner to Example 1 (a) and has a degree of purity of 99.99%. The solvent used is absolute toluene free from oxygen. The initiator solution is a 2.05 molar mesitylmagnesium bromide solution which has been prepared in analogous manner to Example 1(a).

(b) The polymerizations are carried out in the following manner: In each of the examples 48 g (51 ml; 0.48 mol) of methacrylic acid methyl ester are mixed with 1030 ml of toluene and the mixture is cooled to a temperature of 0° C. To the reaction mixture different quantities of the initiator solution are added while stirring under a nitrogen atmosphere. The polymerization takes place at a temperature of 0° C. After periods of time of different length it is discontinued by adding 32 g (1 mol) of methanol. The reaction mixture is worked up as in Example 1 (b) and the polymer is analyzed as in Example 1 (c).

Further details concerning the Examples 38, 39 and 40 can be seen from the following Table V.

TABLE V

| example | initiator quantity (mol %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---|---|---|---|---|---|---|---|
| 38 | 1.7 | 240 | 29.3 | 5.71 | 4.57 | 1.25 | |
| 39 | 6.8 | 10 | 30.9 | 5.14 | 4.57 | 1.13 | > 90 |
| 40 | 6.8 | 240 | 47.3 | 5.71 | 5.14 | 1.11 | |

COMPARATIVE EXAMPLES I, K AND L (a) The polymerizations are performed as in Examples 38, 39 and 40 using as monomer methacrylic acid methyl ester and toluene as the solvent. The initiator solution, however, is the phenylmagnesium bromide solution according to the Comparative Examples A to H.

(b) Polymerization, working up and analysis are performed as in the Examples 38, 39 and 40.

Further details concerning the Comparative Examples I, K and L can be seen from the following Table VI.

TABLE VI

| example | initiator quantity (mole %) | polymeriz. time (min) | polymer yield (weight %) | $\overline{M}_w/10^3$ | $\overline{M}_n/10^3$ | $\overline{M}_w/\overline{M}_n$ | isotacticity (%) |
|---|---|---|---|---|---|---|---|
| I | 1.7 | 240 | 12.3 | 9.13 | 6.28 | 1.45 | |
| K | 6.8 | 30 | 19.8 | 6.28 | 5.14 | 1.22 | > 90 |
| L | 6.8 | 240 | 29.3 | 7.42 | 5.14 | 1.44 | |

What is claimed is:

1. A process for the preparation of a methacrylic acid or acrylic acid ester polymer having a weight average molecular weight of from 2,000 to 100,000, a range of the molecular weight distribution of less than 1.5 and an isotacticity of at least 90%, which comprises polymerizing a methacrylic or acrylic acid $C_1$ to $C_4$ alkyl ester in an inert non-polar organic solvent, at a temperature of from $-94°$ to $+30°$ C. in the presence of a magnesium-organic compound which is a phenylmagnesium halide having at least one alkyl or alkoxy substituent in ortho position to the magnesium.

2. Process as claimed in claim 1, wherein said ester is an acrylic acid methyl, ethyl or isopropyl ester.

3. Process as claimed in claim 1, wherein said ester is a methacrylic acid methyl, ethyl or isopropyl ester.

4. Process as claimed in claim 1, which comprises using as substituted phenylmagnesium halide a substituted phenylmagnesium bromide.

5. A process for the preparation of a methacrylic acid or acrylic acid ester polymer having a weight average molecular weight of 2,000 to 100,000, a range of molecular weight distribution of less than 1.5 and an isotacticity of at least 90% which comprises polymerizing a $C_1$ to $C_4$ alkyl ester of methacrylic acid or acrylic acid in an inert non-polar organic solvent, at a temperature of from $-94°$ to $+30°$ C. in the presence of a phenylmagnesium halide of the formula:

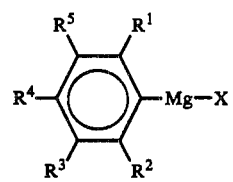

[(I)]

wherein X is a halogen atom and $R^1$ to $R^5$ are each hydrogen or a hydrocarbon radical having 1 to 8 carbon atoms which may be linked to the benzene nucleus by an oxygen atom, no more than one of the substituents $R^1$ and $R^2$ being hydrogen.

6. Process as claimed in claim 1, which comprises using as substituted phenylmagnesium halide a compound of the formula (II)

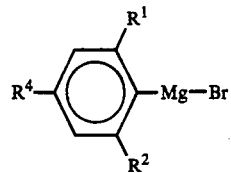
(II)

wherein $R^1$ and $R^2$ each is an alkyl or alkoxy radical having 1, 2, 3 or 4 carbon atoms and $R^4$ is a hydrogen atom or an alkyl or alkoxy radical having 1, 2, 3 or 4 carbon atoms.

7. Process as claimed in claim 6, which comprises using as substituted phenylmagnesium halide mesitylmagnesium bromide.

8. Process as claimed in claim 1, which comprises performing the polymerization with the exclusion of oxygen and water.

9. Process as claimed in claim 1, which comprises terminating the polymerization with a chain stopper when a monomer conversion of at least 90% has been attained.

10. Process as claimed in claim 9, which comprises using as a chain stopper an aldehyde, a ketone or a thioketone to obtain at least one functional terminal group on the polymer.

* * * * *